US010309250B2

(12) United States Patent
Herbaut et al.

(10) Patent No.: US 10,309,250 B2
(45) Date of Patent: Jun. 4, 2019

(54) SPLITTER NOSE WITH PLASMA DE-ICING FOR AXIAL TURBINE ENGINE COMPRESSOR

(71) Applicant: Techspace Aero S.A., Herstal (Milmort) (BE)

(72) Inventors: Ghislain Herbaut, Berloz (BE); David Bouillon, Woluwe-Saint-Lambert (BE)

(73) Assignee: SAFRAN AERO BOOSTERS SA (BE)

( * ) Notice: Subject to any disclaimer, the term of this patent is extended or adjusted under 35 U.S.C. 154(b) by 640 days.

(21) Appl. No.: 14/918,041

(22) Filed: Oct. 20, 2015

(65) Prior Publication Data
US 2016/0108754 A1    Apr. 21, 2016

(30) Foreign Application Priority Data
Oct. 21, 2014    (BE) .................................. 2014/0772

(51) Int. Cl.
*F01D 25/02*  (2006.01)
*F01D 9/04*  (2006.01)
(Continued)

(52) U.S. Cl.
CPC .............. *F01D 25/02* (2013.01); *B64D 15/12* (2013.01); *B64D 15/163* (2013.01); *B64D 33/02* (2013.01);
(Continued)

(58) Field of Classification Search
CPC .......... F01D 25/02; F01D 9/041; F01D 25/24; F05D 2270/172; F05D 2220/30;
(Continued)

(56) References Cited

U.S. PATENT DOCUMENTS

| 2,762,897 A | * | 9/1956 | Vrooman | B64D 15/12 |
| | | | | 219/202 |
| 3,178,560 A | * | 4/1965 | Mapp | A47L 1/16 |
| | | | | 219/528 |
| 4,782,658 A | * | 11/1988 | Perry | F02C 7/047 |
| | | | | 60/226.1 |
| 5,297,765 A | * | 3/1994 | Hughes | B64C 21/06 |
| | | | | 244/130 |

(Continued)

FOREIGN PATENT DOCUMENTS

| EP | 2365219 A2 | 9/2011 |
| FR | 931295 A | 2/1948 |
| JP | 2008159336 A | 7/2008 |

OTHER PUBLICATIONS

European Search Report from corresponding Belgium Application No. BE 201400772, dated Jun. 8, 2015.

*Primary Examiner* — Ninh H. Nguyen
*Assistant Examiner* — Wayne A Lambert
(74) *Attorney, Agent, or Firm* — Sandberg Phoenix & von Gontard P.C.

(57) ABSTRACT

The invention deals with a splitter nose delimiting the inlet of a low-pressure compressor of an axial turbine engine. The splitter nose comprises a separation surface with an upstream circular edge suitable for separating a flow entering into the turbine engine into a primary flow and a secondary flow, and a plasma de-icing device. The device comprises two annular layers of dielectric material (42; 44) partially forming the separation surface, an electrode forming the upstream edge, an electrode forming an outer wall of the splitter nose, an electrode forming an outer shroud which supports blades, an electrode delimiting the primary flow. The device generates plasmas (46; 48; 50) opposing the presence of ice on the partitions of the splitter nose. The invention also deals with a turbine engine with a splitter nose that is provided with a de-icing system downstream of the fan.

11 Claims, 2 Drawing Sheets

Figure 1:
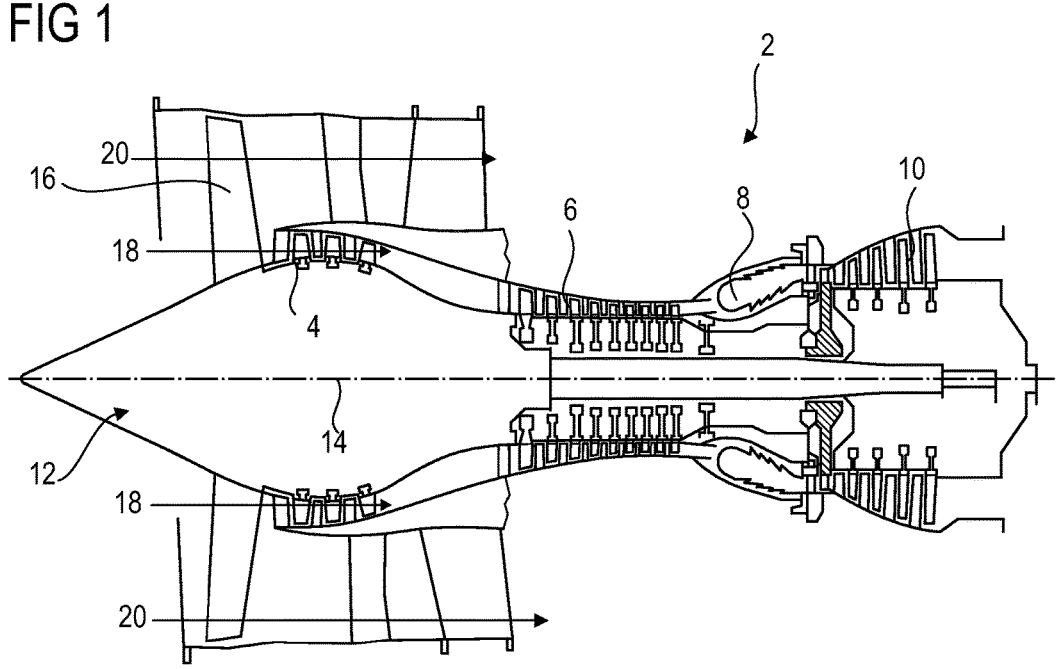

(51) Int. Cl.

| | | |
|---|---|---|
| *F01D 25/24* | (2006.01) | |
| *H05H 1/24* | (2006.01) | |
| *B64D 15/12* | (2006.01) | |
| *B64D 15/16* | (2006.01) | |
| *F02C 7/047* | (2006.01) | |
| *B64D 33/02* | (2006.01) | |

(52) U.S. Cl.
  CPC ............. *F01D 9/041* (2013.01); *F01D 25/24* (2013.01); *F02C 7/047* (2013.01); *H05H 1/2406* (2013.01); *B64D 2033/0226* (2013.01); *B64D 2033/0233* (2013.01); *F05D 2220/30* (2013.01); *F05D 2240/12* (2013.01); *F05D 2270/172* (2013.01); *F05D 2300/40* (2013.01); *F05D 2300/603* (2013.01); *H05H 2001/2425* (2013.01); *Y02T 50/672* (2013.01)

(58) Field of Classification Search
  CPC ........... F05D 2240/12; F05D 2300/603; F05D 2300/40; B64D 33/02; B64D 15/163; B64D 15/12; B64D 2033/0233; B64D 2033/0226; F02C 7/047; H05H 1/2406; H05H 2001/2425; Y02T 50/672
  See application file for complete search history.

(56) References Cited

U.S. PATENT DOCUMENTS

| | | | | |
|---|---|---|---|---|
| 5,632,600 | A * | 5/1997 | Hull | F01D 5/06 416/198 A |
| 5,657,952 | A * | 8/1997 | Goldberg | B64D 15/163 244/134 D |
| 6,561,760 | B2 * | 5/2003 | Wadia | F01D 25/02 415/145 |
| 6,570,333 | B1 | 5/2003 | Miller et al. | |
| 7,938,368 | B2 * | 5/2011 | Hogate | F02C 7/047 244/134 A |
| 8,006,934 | B2 * | 8/2011 | Alexander | F02C 7/047 219/526 |
| 8,038,397 | B2 * | 10/2011 | Saddoughi | F03D 80/40 416/39 |
| 2004/0065092 | A1 | 4/2004 | Wadia et al. | |
| 2006/0165519 | A1 * | 7/2006 | McMillan | F01D 21/045 415/173.1 |
| 2008/0023589 | A1 | 1/2008 | Miles et al. | |
| 2012/0192544 | A1 * | 8/2012 | Roby | F01D 25/02 60/226.1 |
| 2013/0291979 | A1 | 11/2013 | Nordin et al. | |
| 2014/0161597 | A1 * | 6/2014 | Thise | F01D 25/02 415/176 |

* cited by examiner

SPLITTER NOSE WITH PLASMA DE-ICING FOR AXIAL TURBINE ENGINE COMPRESSOR

CROSS-REFERENCE TO RELATED APPLICATIONS

This application claims the benefit, under 35 U.S.C. § 119, of BE 2014/0772 filed Oct. 21, 2014, the disclosure of which is incorporated herein by reference in its entirety.

FIELD

The invention deals with a splitter nose of an axial turbine engine with a de-icing system. More particularly, the invention deals with a splitter nose for a primary flow and a secondary flow of a turbine engine, the splitter nose being provided with a de-icing system. The invention also deals with a turbine engine comprising a splitter nose with a de-icing system.

BACKGROUND

In order to optimize their thrust and their efficiency while reducing noise nuisance, jet engines work with a plurality of annular air flows. Generally, a turbine engine separates an incoming flow into a primary flow and a secondary flow; the latter two have the forms of annular sleeves. The primary flow goes through the compressors, a combustion chamber, then is expanded in turbines. The secondary flow outwardly circumvents the compressor, the combustion chamber, the turbine; and then rejoins the primary flow at the outlet of the jet engine. The flows are separated by a circular splitter nose placed upstream of the compressor, its geometry limits the entry of air into the compressor.

The air entering into the turbine engine remains at atmospheric temperature at the splitter nose. Since these temperatures can drop to −50° C. at altitude, ice can form on the nose with the moisture. During a flight, this ice can extend and build up to form blocks at the head of stator blades of the compressor. These blocks can thus modify the geometry of the nose and affect the air flow entering into the compressor, which can reduce its efficiency. Unchecked, the blocks can become particularly massive. Consequently there is a risk of them becoming detached and being ingested by the compressor, with the risk of damaging the rotor and stator blades in passing. To the extent that it does not first undergo a passage through the fan, this ingestion is particularly detrimental. To limit this formation of ice, the splitter noses are provided with a de-icing device.

The document US2004065092 A1 discloses an axial turbine engine including a low-pressure compressor whose inlet is delimited by an annular splitter nose. The nose is used to separate a flow entering into the turbine engine into a primary flow entering into the compressor, and a secondary flow circumventing the compressor. The splitter nose is linked to the upstream row of blades of the compressor and comprises an electric de-icing system with an epoxy resin covering the body of the splitter nose, and a heating resistor embedded in the resin. The resistor takes the form of a winding to increase the heat imparted to the splitter nose, but this coil form requires the thickness of the layer of resin to be increased. This increase in thickness adds a geometrical constraint. With the splitter nose becoming less sharp, more disturbances appear in the separated flows, which reduces the efficiency of the turbine engine.

SUMMARY

The aim of the invention is to resolve at least one of the problems raised by the prior art. More specifically, the aim of the invention is to increase the efficiency of a turbine engine provided with a splitter nose with a de-icing system. Another aim of the invention is to improve the de-icing of a splitter nose between a primary flow and a secondary flow of an axial turbine engine.

It will have been well understood that the subject of the invention is a splitter nose with a system for forming plasma on an annular flow guiding surface of a turbine engine, the plasma being adapted to heat up the surface, e.g., adapted to de-ice it. The invention makes it possible to both avoid the formation of ice and in various instances liquefy the ice.

The subject of the invention is a splitter nose of an axial turbine engine, the nose comprising: a separation surface with an upstream circular edge, intended to separate a flow entering into the turbine engine into a primary annular flow and a secondary annular flow; a layer of dielectric material partially forming the separation surface. It further comprises at least one de-icing plasma-generating electrode, which partially forms the separation surface and which is adapted to be able to form a plasma in combination with the dielectric layer in order to de-ice the separation surface.

According to various advantageous embodiments of the invention, the, or at least one, plasma-generating electrode forms the upstream edge of the separation surface, in various instances the electrode runs along the upstream edge over most of its perimeter.

According to various advantageous embodiments of the invention, the, or at least one, plasma-generating electrode is arranged so as to delimit the primary flow of the turbine engine.

According to various advantageous embodiments of the invention, the electrode has at least one face, in various instances a main face, totally covered by the dielectric layer, in various instances the electrode is a profiled member of rectangular section, the electrode having three faces totally covered by the dielectric layer.

According to various advantageous embodiments of the invention, the separation surface comprises an inner annular portion intended to delimit the primary flow, an outer annular portion intended to delimit the secondary flow, and a joining annular portion linking the inner annular portion to the outer annular portion, in various instances the electrode is arranged on the joining portion.

According to various advantageous embodiments of the invention, the dielectric layer occupies substantially all of the joining portion.

According to various advantageous embodiments of the invention, the separation surface has a profile of revolution about the axis of rotation of the turbine engine, the profile of the outer portion is generally more inclined relative to the axis of rotation than the profile of the inner portion, in various implementations the profiles are generally inclined relative to one another by an angle less than 45°, e.g., less than 30°, e.g., less than 20°.

According to various advantageous embodiments of the invention, the separation surface has a profile of revolution about the axis of rotation of the turbine engine, the profiles of the inner and outer annular portions being generally straight, and the profile of the joining portion is curved with a radius of curvature R less than 50.00 mm, e.g., less than 10.00 mm, e.g., less than 5.00 mm.

According to various advantageous embodiments of the invention, the electrode is a first electrode, the splitter nose comprising a second electrode separated from the first electrode by the dielectric layer, the electrodes being configured to be able to form a plasma on the separation surface in combination with the layer of dielectric material.

According to various advantageous embodiments of the invention, the splitter nose comprises an outer annular wall, in various instances the outer wall is the second electrode.

According to various advantageous embodiments of the invention, the outer wall comprises an upstream annular hook with an upstream surface and a downstream surface that can be open axially in the downstream direction, the dielectric layer covering the upstream surface of the hook.

According to various advantageous embodiments of the invention, the splitter nose comprises an outer shroud and an annular row of stator blades extending radially inwards from the outer shroud, in various instances the outer shroud is the second electrode.

According to various advantageous embodiments of the invention, the splitter nose comprises at least one body made of composite material with an organic matrix and fibres, for example glass fibres; in various instances, the composite body is the outer shroud and/or the outer annular wall.

According to various advantageous embodiments of the invention, the dielectric layer is formed by the matrix of the composite material.

According to various advantageous embodiments of the invention, the dielectric layer is a first dielectric layer, the splitter nose further comprising a second circular dielectric layer with a tubular portion, in various instances, the dielectric layers are separated axially by a circular gap.

According to various advantageous embodiments of the invention, the dielectric layers each have a form of revolution with a profile of revolution about the axis of rotation, the dielectric layer furthest upstream has a profile of revolution radially higher than the other dielectric layer.

According to various advantageous embodiments of the invention, the electrode is a first electrode, the nose comprising at least four electrodes distributed in two sets of electrodes configured to be able to generate at least two, in various embodiments at least three, circular plasmas to de-ice the separation surface.

According to various advantageous embodiments of the invention, the splitter nose is configured to delimit and/or form the inlet of a compressor of the axial turbine engine.

According to various advantageous embodiments of the invention, the, or each, plasma has an annular form, in various instances the plasma is segmented and forms a plurality of arcs.

According to various advantageous embodiments of the invention, the splitter nose comprises two first electrodes surrounded by at least one dielectric layer, the first electrodes being more than 1.00 mm apart; e.g., more than 3.00 mm apart.

According to various advantageous embodiments of the invention, the splitter nose comprises two second electrodes separated from one another by a dielectric layer, in various instances the layer being can be in annular contact with each of the second electrodes.

According to various advantageous embodiments of the invention, at least one, or each, dielectric layer has a constant thickness.

According to various advantageous embodiments of the invention, the electrode is at least partially, in various implementations totally, incorporated in the thickness of the dielectric layer.

According to various advantageous embodiments of the invention, the profiles of revolution about the axis of rotation of the turbine engine of the inner and outer annular portions are generally straight and inclined relative to one another by an angle greater than 5°, for example greater than 10°, e.g., greater than 15°.

According to various advantageous embodiments of the invention, the splitter nose is a splitter nose formed on an upstream end of a compressor, notably low-pressure, of an axial turbine engine; or the splitter nose is formed on an upstream casing of an axial turbine engine, the upstream casing comprising a primary annular seam for the primary flow and a secondary annular seam for the secondary flow.

According to various advantageous embodiments of the invention, the splitter nose comprises two dielectric layers and two sets of electrodes, each set having a first electrode intended to be in contact with a flow of the turbine engine, a second electrode, a dielectric layer being inserted between each second electrode and a flow of the turbine engine.

According to various advantageous embodiments of the invention, the separation surface has a profile of revolution about the axis of rotation of the turbine engine, the profile of revolution of the outer portion forms the radial majority of the profile of revolution of the separation surface.

According to various advantageous embodiments of the invention, the splitter nose has a generally circular blade form with a circular blade cord, or circular edge, oriented axially in the upstream direction, preferentially the circular blade comprises a sharpening oriented axially in the upstream direction. "Sharpening" should be understood to mean the part of the blade which is thinned, in various instances gradually, to form the cutting edge with the cord of the blade.

An axial turbine engine comprising a splitter nose, wherein the splitter nose conforms to the invention, is also a subject of the invention.

According to various advantageous embodiments of the invention, the turbine engine comprises a fan, the splitter nose being arranged downstream of the fan.

According to various advantageous embodiments of the invention, the turbine engine comprises a power supply connected to at least one, in various instances to each, electrode, and which is configured to form at least one de-icing plasma with the at least one electrode and at least one dielectric layer.

According to various advantageous embodiments of the invention, the turbine engine comprises a primary annular vein for a primary annular flow, and a secondary annular vein for a secondary annular flow.

The invention offers an energy-efficient system, which makes it possible to de-ice the splitter nose with a minimum of primary energy. The overall efficiency of the turbine engine is thereby improved. The distribution of the electrodes; and the thickness and the configuration of the dielectric layers make it possible to distribute plasma zones to combat the build-up of ice. The presence of a plurality of sets of electrodes limits the level of energy required.

The use of the plasma is light by virtue of the thinness of its electrodes. The temperature can be set so as not to degrade the dielectric layer, which facilitates the adoption of a wall and a shroud that are composites with organic matrices. The chosen configuration is robust and makes it possible to withstand the ingestions of foreign bodies. In the event of a loss of a blade, the splitter nose withstands strong accelerations, for example of 100 g.

DRAWINGS

FIG. 1 outlines an axial turbine engine according to various embodiments of the invention.

Figure 2:
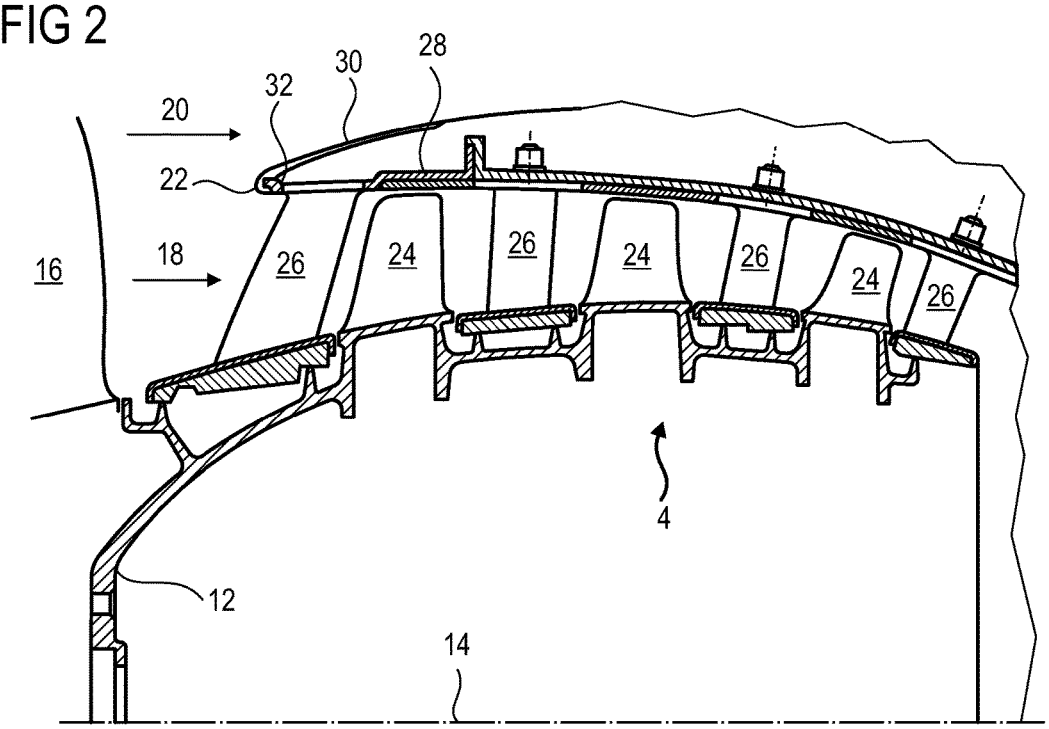

FIG. 2 delineates a turbine engine compressor according to various embodiments of the invention.

Figure 3:
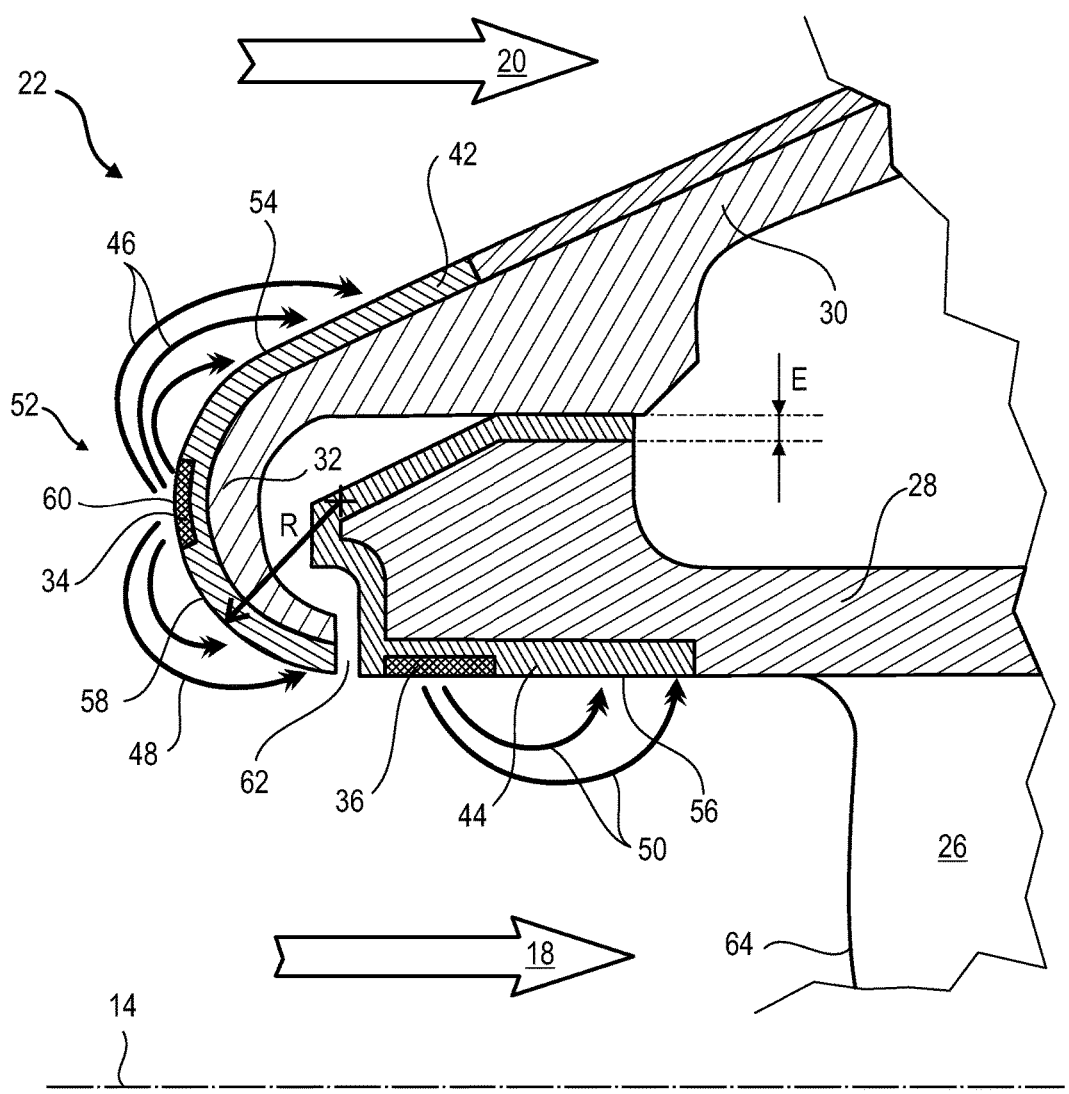

FIG. 3 represents a splitter nose according to various embodiments of the invention.

DESCRIPTION

In the following description, the terms internal or inner and external or outer refer to a positioning relative to the axis of rotation of an axial turbine engine.

FIG. 1 is a simplified representation of an axial turbine engine. In this exemplary case, it is a double-flow jet engine. The jet engine 2 comprises a first level of compression, called low-pressure compressor 4, a second level of compression, called high-pressure compressor 6, a combustion chamber 8 and one or more turbine levels 10. In operation, the mechanical power of the turbine 10 transmitted via the central shaft to the rotor 12 sets the two compressors 4 and 6 in motion. The latter comprise a number of rows of rotor blades associated with rows of stator blades. The rotation of the rotor 12 about its axis of rotation 14 thus makes it possible to generate a flow of air and progressively compress the latter to the inlet of the combustion chamber 8. Gear reduction means make it possible to increase the speed of rotation transmitted to the compressors.

An inlet fan, commonly called fan or blower 16, is coupled to the rotor 12 and generates a flow of air which is divided into a primary flow 18 passing through the various above mentioned levels of the turbine engine, and a secondary flow 20 passing through an annular duct (partially represented) along the machine to then rejoin the primary flow at the turbine outlet. The secondary flow 20 can be accelerated so as to generate a thrust reaction. The primary 18 and secondary 20 flows are annular flows, they are channeled by the casing of the turbine engine.

FIG. 2 is a cross-sectional view of a compressor of an axial turbine engine such as that of FIG. 1. The compressor can be a low-pressure compressor 4. The figure shows a part of the fan 16 and the splitter nose 22 for the primary flow 18 and the secondary flow 20. The rotor 12 comprises a number of rows of rotor blades 24, e.g., three.

The low-pressure compressor 4 comprises a number of synchronization rings, e.g., four, which each contain a row of stator blades 26. The synchronization rings are associated with the fan 16 or with a row of rotor blades 24 to straighten the flow of air, so as to convert the velocity of the flow into static pressure.

The splitter nose 22 circumferentially and/or axially delimits the inlet of the compressor 4. The splitter nose 22 can comprise an outer shroud 28 and an outer annular wall 30 which can be linked using an annular hook 32 formed on the outer wall 30. The stator blades 26 extend essentially radially from the outer shroud 28 to which they are welded. In order to avoid the presence or the formation of frost, of ice on the splitter nose 22, the latter is provided or associated with a plasma de-icing system or plasma generator. The plasma de-icing system or plasma generator makes it possible to heat up the splitter nose 22, in particular the air situated upstream, in order to avoid having frost form thereon and build up thereon; and/or in order to melt a layer of frost which might have appeared thereon.

The splitter nose 22 corresponds to an upstream part of the casing of the compressor and is mounted overhanging thereon. According to the invention, the splitter nose can also be an upstream axial turbine engine casing, for example a fan mounting casing. The upstream casing can include a primary annular seam for the primary flow and a secondary annular seam for the secondary flow, the annular seams being coaxial and one inside the other. It can comprise a row of casing arms passing through the secondary seam.

FIG. 3 represents a splitter nose 22 with electrodes (28; 30; 34; 36) and dielectric layers (42; 44) configured to create de-icing plasmas (46; 48; 50). The axis of rotation 14, the primary flow 18 and the secondary flow 20 are represented.

The splitter nose 22 has a separation surface 52 which makes it possible to split the flow from the fan by dividing it up between the primary flow 18 and the secondary flow 20. The separation surface 52 has a form of revolution about the axis of rotation 14, its profile of revolution is in the form of a wedge; of acute angle. It forms a protruding and essentially thin circular blade, which has the effect of preserving the passage section remaining to the primary and secondary flows for a given incoming flow. The efficiency of the turbine engine is thus advantageously optimized.

The separation surface 52 forms the skin, the jacket of the splitter nose 22; it faces more in the upstream direction than in the downstream direction. It comprises an outer annular portion 54 formed by the outer annular wall 30 which guides the secondary flow 20; an inner annular portion 56 formed by the outer shroud 28, in contact with the primary flow 18; and a joining annular portion 58 where the upstream circular edge 60 which forms a protruding leading edge can be arranged. The profile of revolution of the outer portion 54 is generally straight and inclined relative to the axis of rotation 14. The profile of revolution of the inner portion 56 is substantially straight and substantially parallel to the axis of rotation 14. The profiles of revolution of the inner 56 and outer 54 annular portions are generally inclined relative to one another by an angle of between 5° and 45°, e.g., between 20° and 25°. They can converge in the upstream direction. The joining portion 58 can have a curved or bent profile, with an average and/or constant radius of curvature R less than 100 mm, in various implementations less than or equal to 5 mm. The joining portion 58 is distinguished from at least one or from each inner or outer annular portion in that the profile there becomes straight. Alternatively, the joining portion can essentially be a circular line, such as the upstream circular edge; it can essentially be a rectilinear extension of a profile of the annular portions.

The plasma generator comprises a number of sets of electrodes (28; 30; 34; 36), e.g., two sets, and two layers of dielectric materials (42; 44). In various implementations, a same dielectric layer (42; 44) is common to several sets of electrodes. At least one dielectric layer (42; 44) can comprise epoxy. Each dielectric layer (42; 44) can have a form of revolution about the axis of rotation 14, with a profile of revolution in the form of a hook which envelops an upstream portion of the shroud or of the wall. The profile of revolution of the dielectric layer furthest upstream 42 can overlap the profile of the other dielectric layer 44 over substantially all of its height. A dielectric layer 44 or a portion of dielectric layer can be at the interface between the wall 30 and the shroud 28, by forming a tubular seal. At least one or each layer has a thickness E, in various instances constant, of between 0.10 and 1.00 mm, for example between 0.40 mm and 0.60 mm, in some instances equal to 0.50 mm. The dielectric layers (42; 44) are separated axially by an annular groove 62 forming an axial circular gap 62, which can allow for a relative movement between the shroud 28 and the wall 30 at the level of the hook 32. This particular feature offers the advantage of allowing for a differential expansion.

One of the sets of electrodes, or upstream set, comprises a first electrode 34 which can form the upstream circular edge 60 by running along it. The first electrode 34 has an upstream face facing the incoming flow; from the fan. It is arranged radially; at mid-height of the joining portion 58. The upstream set comprises a second electrode 30, which can be formed by the outer wall 30 of the splitter nose. This second electrode 30 can also equally be another added electrode. The upstream dielectric layer 42, which is the furthest upstream, is inserted between the electrodes (30; 34) of the upstream set and forms the joining portion 58. It covers the wall 30 over its portion forming the hook 32. The upstream set of electrodes makes it possible to create a number of annular plasmas (46; 48), e.g., two, inside and outside the upstream edge 60. The outer plasma 46 extends downstream on the separation surface.

Another set of electrodes (28; 36), or downstream set, or even inner set; in as much as this set is surrounded by the upstream set and/or begins downstream of the upstream set; comprises a delimiting first electrode 36, encircling the primary flow. Its second electrode 28 can be the outer shroud 28, or another added electrode. The inner dielectric layer 44 extends from the associated first electrode 36 towards the blade 26; in various instances over most of the space between the associated first electrode 36 and the outer radial end of the leading edge 64 of the blade. This set makes it possible to generate a plasma 50 inside the splitter nose.

At least one or each first electrode (34; 36) is at least partially housed in the thickness of the associated dielectric layer 44. At least one or each first electrode (34; 36) can be circular and coaxial with the nose, and/or can have a profiled form, with a rectangular section. One of the main sides of the rectangle is in contact with a flow (18; 20), the main aspect corresponds to the size of the side and therefore to the surface of the corresponding electrode. Three other sides, including a main side, are mostly or totally covered by a dielectric layer (42; 44).

Each set makes it possible to form a circular plasma (46; 48; 50). At least one or more plasmas can be formed in one or more toric portions. A plasma can be segmented, and be formed by a number of angular plasma portions.

The plasma generator comprises a power supply (not represented) which provides, for example, a voltage of 2 kV to 10 kV, a sinusoidal or square alternating signal with a period of a few nanoseconds. At least one or more electrodes are linked to the ground. The plasma generator is configured so as to ionize a portion of the gas, and to drive the ions formed using an electrical field. In addition, the plasma generator is configured to heat up the air.

In various implementations, the outer wall of the de-icing nose and/or the outer shroud is made of a composite material with organic matrix such as epoxy. The composite can also comprise glass fibres. According to this alternative, the composite can form a dielectric layer; in various instances the shroud and/or the wall is merged with its dielectric layer. In this case, additional electrodes can be added to form different sets and generate a number of plasmas.

What is claimed is:

1. An axial turbine engine compressor, said compressor comprising
    a splitter nose, the splitter nose comprising:
        a separation surface with an upstream circular edge, intended to split a flow entering into the turbine engine into a primary annular flow and a secondary annular flow wherein the separation surface comprises an inner annular portion intended to delimit the primary flow, an outer annular portion intended to delimit the secondary flow and the upstream circular edge linking the inner annular portion to the outer annular portion;
        a first layer of dielectric material partially forming the separation surface;
        a first electrode which partially forms the separation surface and which is adapted to form a plasma in combination with the first dielectric layer in order to de-ice the separation surface, the first electrode being arranged on the upstream circular edge,
        a second layer of dielectric material, distinct from the first layer of dielectric material, the second layer of dielectric material having a tubular portion; and
        a second electrode separated from the first electrode by the first layer of dielectric material, the second electrode being configured to be able to form a plasma on the separation surface in combination with the second layer of dielectric material,
        wherein the first and second dielectric layers are separated axially by an annular groove forming an axial circular gap, which can allow for a relative movement between the first electrode and the second electrode.

2. The axial turbine engine compressor in accordance with claim 1, wherein the compressor comprises;
    an outer wall on which the first layer of dielectric material is arranged; and
    an outer shroud and an annular row of stator blades extending radially inwards from the outer shroud, wherein the second layer of dielectric material is arranged on the outer shroud.

3. The axial turbine engine compressor in accordance with claim 2, wherein the outer wall is inwardly in contact with the second layer of dielectric material.

4. The axial turbine engine compressor in accordance with claim 1, wherein the first and second layers of dielectric material are formed by a respective organic matrix of a composite material.

5. The axial turbine engine compressor in accordance with claim 1, wherein the layers of dielectric material each have a form of revolution with a profile of revolution about the axis of rotation, the first layer of dielectric material being upstream the second layer of dielectric material and the first layer of dielectric material having a profile of revolution radially higher than the profile of revolution of the second layer of dielectric material.

6. The axial turbine engine compressor in accordance with claim 1, wherein the nose comprises at least four electrodes distributed in two sets of electrodes configured to be able to generate at least two circular plasmas to de-ice the separation surface, each set of electrodes being separated by a respective layer amongst the first and second layers of dielectric material.

7. The axial turbine engine compressor in accordance with claim 1, wherein the first and second layers of dielectric material are U-shaped and cover upstreamingly an outer wall and an outer shroud respectively.

8. The axial turbine engine compressor in accordance with claim 7, wherein the outer wall is inwardly in contact with the second layer of dielectric material.

9. The axial turbine engine compressor in accordance with claim 1, wherein the first electrode is configured to generate a plasma which flows radially outwardly and inwardly from the first electrode, and the second electrode is configured to form a plasma which flows axially downstream from the second electrode.

10. The axial turbine engine compressor in accordance with claim 1 wherein the compressor comprises:
    an outer wall on which the first layer of dielectric material is arranged, the first layer of dielectric material being arranged between the first electrode and the outer wall, such that the first electrode and the outer wall form a first set of electrodes generating plasma.

11. The axial turbine engine compressor in accordance with claim 1 wherein the compressor comprises:
an outer shroud and an annular row of stator blades extending radially inwards from the outer shroud, wherein the second layer of dielectric material is arranged between the outer shroud and the second electrode, such that the second electrode and the outer shroud form a second set of electrodes generating plasma.

* * * * *